United States Patent
Padmanaban et al.

(10) Patent No.: US 12,118,626 B2
(45) Date of Patent: Oct. 15, 2024

(54) GENERATING CONTEXT-AWARE PROCESS-BASED MODEL DETERMINATIONS FOR GREENHOUSE GAS EMISSIONS FROM AGRICULTURAL FIELDS

(71) Applicant: International Business Machines Corporation, Armonk, NY (US)

(72) Inventors: Manikandan Padmanaban, Bangalore (IN); Ranjini Bangalore Guruprasad, Bangalore (IN); Isaac Waweru Wambugu, Nairobi (KE); Kumar Saurav, Bangalore (IN); Ivan Kayongo, Nairobi (KE); Jagabondhu Hazra, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 259 days.

(21) Appl. No.: 17/495,573

(22) Filed: Oct. 6, 2021

(65) Prior Publication Data
US 2023/0107533 A1 Apr. 6, 2023

(51) Int. Cl.
G06Q 50/02 (2024.01)
G06Q 10/04 (2023.01)
G06Q 30/018 (2023.01)

(52) U.S. Cl.
CPC ............ *G06Q 50/02* (2013.01); *G06Q 10/04* (2013.01); *G06Q 30/018* (2013.01); Y02P 90/84 (2015.11)

(58) Field of Classification Search
CPC ......... G06Q 10/063118; G06Q 10/067; G06Q 30/018; G06Q 50/02; G06Q 10/04; Y02P 90/84

(Continued)

(56) References Cited

U.S. PATENT DOCUMENTS 7,966,971 B2 6/2011 Zimmerman
8,595,020 B2 11/2013 Marino
(Continued)

FOREIGN PATENT DOCUMENTS

AU 2016203849 B2 6/2016
CN 103714507 A 4/2014
(Continued)

OTHER PUBLICATIONS

Hamrani, et al., Machine learning for predicting greenhouse gas emissions from agricultural soils, 741 Science of The Total Environment 140338 (2020) (Year: 2020).*

(Continued)

*Primary Examiner* — Charles Guiliano
(74) *Attorney, Agent, or Firm* — Ryan, Mason & Lewis, LLP

(57) ABSTRACT

Methods, systems, and computer program products for generating context-aware process-based model determinations for greenhouse gas emissions from agricultural fields are provided herein. A computer-implemented method includes obtaining data related to multiple conditions pertaining to at least one agricultural field; deriving one or more contextual features for one or more activities associated with the at least one agricultural field, wherein deriving the contextual feature(s) includes processing at least a portion of the obtained data using one or more activity-related models; updating one or more greenhouse gas emission estimates, pertaining to the at least one agricultural field, generated by at least one process-based model by processing at least a portion of the one or more greenhouse gas emission estimates and at least a portion of the derived contextual feature(s) using a spatio-temporal learning model; and performing one or more automated actions based on the one or more updated greenhouse gas emission estimates.

20 Claims, 8 Drawing Sheets

(58) Field of Classification Search
USPC .......................................................... 705/7.17
See application file for complete search history.

(56) References Cited

U.S. PATENT DOCUMENTS

| | | | |
|---|---|---|---|
| 11,704,581 B1* | 7/2023 | McEntire | G06V 20/188 706/11 |
| 2009/0288606 A1 | 11/2009 | Zimmerman | |
| 2011/0313666 A1* | 12/2011 | Hirvi | A01G 22/00 702/2 |
| 2013/0080213 A1 | 3/2013 | Peters | |
| 2013/0179078 A1 | 7/2013 | Griffon | |
| 2014/0172323 A1 | 6/2014 | Marino | |
| 2018/0156766 A1 | 6/2018 | Zeng et al. | |
| 2019/0333163 A1* | 10/2019 | Perry | G06Q 10/06315 |
| 2020/0027096 A1 | 1/2020 | Cooner | |
| 2020/0256978 A1 | 8/2020 | Klein | |
| 2020/0275617 A1 | 9/2020 | Fabijanski et al. | |
| 2021/0010993 A1 | 1/2021 | Shibata | |
| 2021/0199600 A1 | 7/2021 | Das et al. | |
| 2021/0224927 A1* | 7/2021 | Perry | A01B 79/005 |
| 2022/0117215 A1 | 4/2022 | Sibley | |
| 2022/0139081 A1 | 5/2022 | Mohite | |
| 2022/0412553 A1 | 12/2022 | Haddad | |

FOREIGN PATENT DOCUMENTS

| | | |
|---|---|---|
| CN | 104657566 A | 5/2015 |
| CN | 111178789 A | 5/2020 |
| CN | 111896680 A | 11/2020 |
| KR | 20110017816 | 2/2011 |
| WO | 2017048002 A1 | 3/2017 |

OTHER PUBLICATIONS

Shi et al., PeerJ, Herbicide applications increase greenhouse gas emissions of alfalfa pasture in the inland arid region of northwest China, May 25, 2020.

Min et al., DeNitrification-DeComposition (DNDC) Improvement through Model Coupling and Sub-model Development Considering Agricultural Land Use and Future Climate Change, Journal of Environmental Biology • Mar. 2017.

Babu et al., Field Validation of DNDC Model for Methane and Nitrous Oxide Emissions from Rice-based Production Systems of India, Nutrient Cycling in Agroecosystems vol. 74, pp. 157-174 (2006).

Cai et al., Global Biochemical Cycles, Field validation of the DNDC model for greenhouse gas emissions in East Asian cropping systems, Nov. 2003.

Unglesbee, E., DTN.com, Temperature Inversions Increase Risk of Herbicide Drift, Feb. 2017.

Jiang et al., Atmospheric Environment, Application of herbicides is likely to reduce greenhouse gas (N2O and CH4) emissions from rice-wheat cropping systems, vol. 107, Apr. 2015, pp. 62-69.

Kachar et al., Int. Arch. Photogramm. Remote Sens. Spatial Inf. Sci., Detection and Modeling of Temperature Inversion in the Atmosphere Using Modis Images (Case Study: Kermanshah), Dec. 2015.

IBM.com, The Weather company sample, https://www.ibm.com/docs/en/cognos-analytics/11.1.0?topic=s-weather-company-sample, 2021.

Wu et al., Insects, an Advanced Numerical Trajectory Model Tracks a Corn Earworm Moth Migration Event in Texas, USA, Sep. 2018.

Tonnang et al., Ecological Modelling, Advances in crop insect modelling methods—Towards a whole system approach. Jun. 2017.

Gevirtz et al., 1995. Environmental Management Framework Databases Developed Utilizing High-Resolution Satellite Imagery and Their Utility for Environmental Monitoring: Abstract. AAPG Bulletin, 79.

Li et al., (2005) High-Resolution Satellite Image Sources for Disaster Management in Urban Areas. Geo-information for Disaster Management. Springer, Berlin, Heidelberg.

Ranchin, T. Multisensor Fusion, Data Fusion in Remote Sensing and Improvement of the Spatial Resolution of Satellite Images, 2002.

Guo et al., Assessment of Global Carbon Dioxide Concentration Using MODIS and GOSAT Data. Sensors 2012, 12, 16368-16389.

Cui et al., A Soil Moisture Spatial and Temporal Resolution Improving Algorithm Based on Multi-Source Remote Sensing Data and GRNN Model, Feb. 2020.

Nassar et al., (2013). Improving the temporal and spatial distribution of co2 emissions from global fossil fuel emission data sets. Journal of Geophysical Research Atmospheres, 118(2), 917-933.

Fong et al., World Resources Institute, Global Protocol for Community-Scale Greenhouse Gas Emission Inventories, 2014.

List of IBM Patents or Patent Applications Treated as Related.

Thompson et al., Crop Protection, Potential for automatic weed detection and selective herbicide application, vol. 10, Issue 4, Aug. 1991, pp. 254-259.

Wang et al., Computers and Electronics in Agriculture, a review on weed detection using ground-based machine vision and image processing techniques, vol. 158, Mar. 2019, pp. 226-240.

Cui et al., Improving the DNDC biogeochemistry model to simulate soil temperature and emissions of nitrous oxide and carbon dioxide in cold regions, Science of The Total Environment, vol. 687, 2019.

Abdurrahman, Stubble Burning Effects on Health & Environment, Regulation, and Management Practices, Dec. 2020, Science Direct, vol. 2, pp. 1-27 (Year 2020).

* cited by examiner

GENERATING CONTEXT-AWARE PROCESS-BASED MODEL DETERMINATIONS FOR GREENHOUSE GAS EMISSIONS FROM AGRICULTURAL FIELDS

BACKGROUND

The present application generally relates to information technology and, more particularly, to climate-related technologies. More specifically, food supply chains are responsible for non-trivial amounts of greenhouse gas (GHG) emissions, including GHG emissions derived from the farming stage of supply chains. However, accurately measuring and/or estimating GHG emissions at a farm level presents significant challenges.

SUMMARY

In one embodiment of the present invention, techniques for generating and/or implementing context-aware process-based model determinations for GHG emissions from agricultural fields are provided. An exemplary computer-implemented method can include obtaining data related to multiple conditions pertaining to at least one agricultural field and deriving one or more contextual features for one or more activities associated with the at least one agricultural field, wherein deriving the one or more contextual features includes processing at least a portion of the obtained data using one or more activity-related models. The method also includes updating one or more greenhouse gas emission estimates, pertaining to the at least one agricultural field, generated by at least one process-based model by processing at least a portion of the one or more greenhouse gas emission estimates and at least a portion of the one or more derived contextual features using a spatio-temporal learning model. Further, the method additionally includes performing one or more automated actions based at least in part on the one or more updated greenhouse gas emission estimates.

Another embodiment of the invention or elements thereof can be implemented in the form of a computer program product tangibly embodying computer readable instructions which, when implemented, cause a computer to carry out a plurality of method steps, as described herein. Furthermore, another embodiment of the invention or elements thereof can be implemented in the form of a system including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

Figure 1:
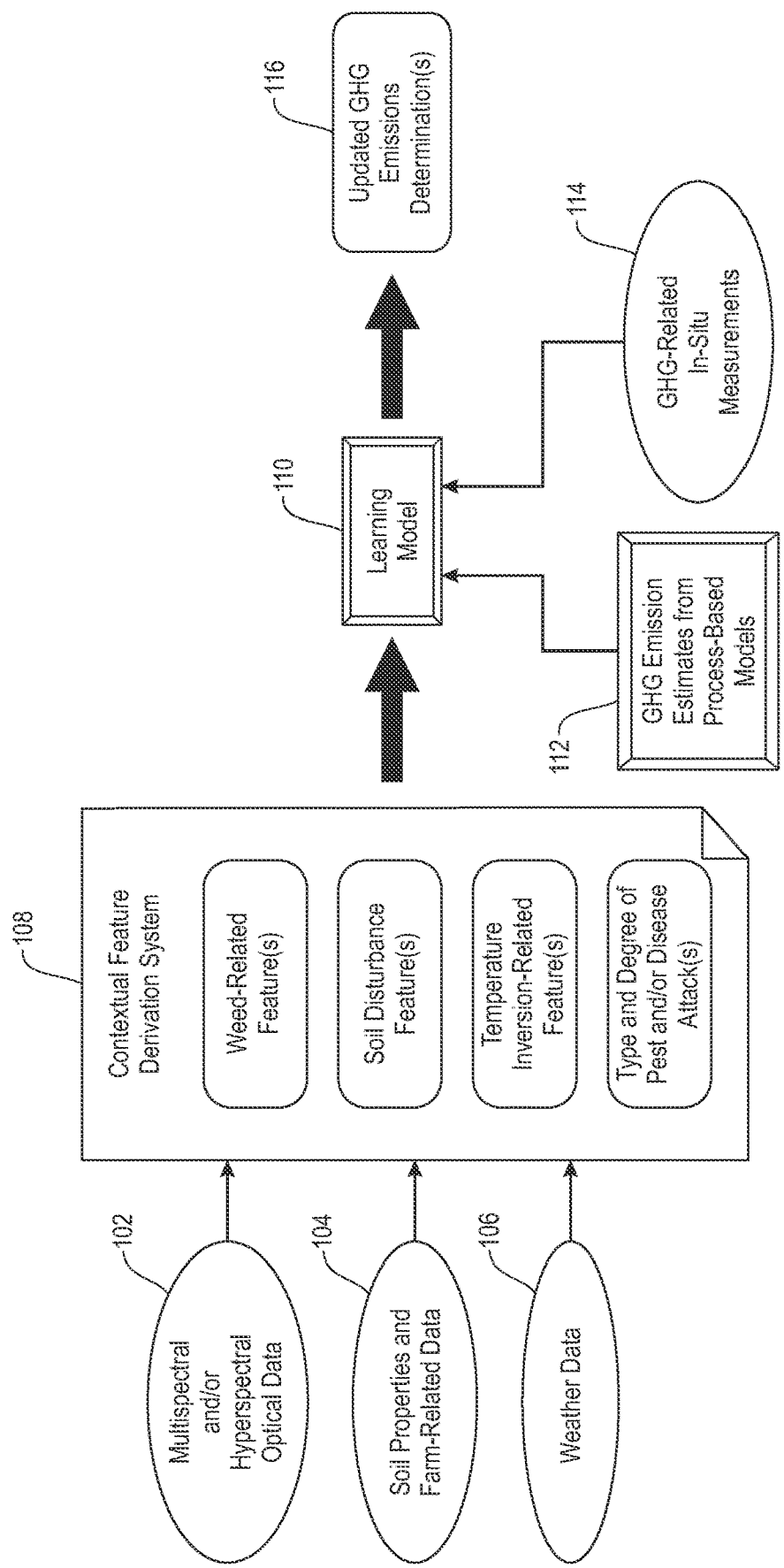
FIG. 1 is a diagram illustrating system architecture, according to an exemplary embodiment of the invention.

As described herein, at least one embodiment includes generating context-aware process-based model determinations for GHG emissions from agricultural fields. In one or more embodiments, contextual features can include, for example, temperature inversion, soil disturbance activity, pest disease, the presence of weeds and/or weeding activity, etc. For instance, with respect to temperature inversion, the spraying of pesticides during temperature inversion activity can change the amount of herbicide(s) reaching the targeted plants. The spray droplets can get arrested by the inversion layer, and at the end of the inversion phenomenon, at least some of the droplets can drift away from the plants. Moreover, commonly used herbicides can increase carbon dioxide ($CO_2$) emissions and reduce methane and nitrous oxide emission, as such herbicides can act as inhibitors for denitrification and fermentation processes.

Also, for example, with respect to soil disturbance activity, emissions from denitrification and fermentation processes can be temporally shifted by soil shrinkage and swelling activity. With respect to pest disease, pest attacks can change the overall biomass content of a plant and, in turn, can impact the carbon and nitrogen dynamics associated with the plant. As further detailed herein, the amount of biomass can play a significant role in process-based GHG emission models, and can directly impact the estimate of root respiration, as well as water and nitrogen intake by the plant. Accordingly, the levels of $CO_2$, methane and/or nitrous oxide estimated by a given process-based model can be different from the actual emissions from the corresponding farm/agricultural field.

As used herein, process-based models can represent and/or refer to any system behavior by explicitly simulating a detailed physical and/or biological process. Such a model can be based, for example, at least in part on well-established mathematical and/or physical laws. By way of illustration, the modelling of GHG emissions from an agro-ecosystem can be regulated in part by climatic conditions, soil characteristics, and farming practices (such as fertilizer and manure managements, etc.).

Further, for example, with respect to the presence of weeds and/or weeding activity, unwanted plants (in a farm and/or portion thereof) can create an imbalance in resource availability and, in turn, can impact carbon and nitrogen dynamics. The residues from weeding activity (e.g., manual weeding activity, firing-based weeding activity, chemical-based weeding activity, etc.) can get decomposed and increase the GHG emissions from associated farms/agricultural fields.

As further detailed herein, at least one embodiment includes providing a temporal and quantitative estimation of farm-level GHG emissions based at least in part on process-based models and deducing contextual information such as farm field soil disturbance, concentration of weeds (unwanted plants), temperature inversion and pest and disease information using hyperspectral remote sensing and weather data. Such an embodiment includes collecting high spatial resolution and/or time resolution optical data and microwave multi/hyper-spectral data from one or more satellites, one or more sensors, and/or one or more measurements such as soil texture, weather data, GHG-related in-situ measurements, etc.

Such an embodiment also includes deriving one or more contextual features from the collected spectral data for one or more events such as soil disturbance, presence of weeds, temperature inversion, type(s) of pest(s), disease attack(s) over a farm/agricultural field of interest or a portion thereof. One or more embodiments also include building a spatio-temporal learning model for quantity and time delay corrections, to one or more process-based model outputs (e.g., estimated GHG (e.g., nitrous oxide, methane, CO2, etc.) emissions), based at least in part on the derived contextual features, GHG in-situ measurements, and/or soil texture and weather data. At least one embodiment can further include performing one or more automated actions using at least a portion of the one or more corrected process-based model outputs such as, for example, automatically training/retraining the one or more process-based models, generating one or more agricultural-related instructions to be carried out by one or more automated systems and/or one or more users, performing one or more automated agricultural-related modifications to the corresponding farm/agricultural field(s) or a portion thereof, etc.

Accordingly, and as further described herein, one or more embodiments include determining and/or deducing contextual information pertaining to at least one farm/agricultural field using hyperspectral remote sensing data and weather data, generating, using the contextual information and one or more process-based model GHG estimates, at least one learning model, and implementing the at least one learning model to generate and/or provide temporally-updated and/or quantitively-updated (in relation to the one or more process-based model GHG estimates) farm/agricultural field-level GHG emissions determinations.

FIG. 1 is a diagram illustrating system architecture, according to an embodiment of the invention. By way of illustration, FIG. 1 depicts a contextual feature derivation system 108, which processes input data including multispectral and/or hyperspectral optical data 102, soil property data and/or farm-related data (e.g., farming practices, etc.) 104, and weather data (e.g., historical data, forecast data, etc.) 106.

By way of example, in at least one embodiment, the type (categorical feature) and degree (numerical feature) of a given weed (i.e., unwanted plant) can be determined and/or extracted by using a combination of remote sensing data and derived spectral features, and can be classified using one or more machine learning algorithms (e.g., support vector machines (SVM)) and/or one or more deep learning-based algorithms (e.g., convolutional neural networks (CNN)). Additionally, time series data pertaining to weeding activity or unwanted plant masking or categorical feature(s) can be used to detect and extract the type of weeding activity (e.g., mechanical, chemical or firing) using one or more time series-based classification algorithms.

A soil disturbance activity, as used herein, typically refers to the intervention of machinery in a farm field for various farming activities such as tilling, weeding, application of fertilizer, herbicides, pesticides, etc. The presence (categorical feature) and degree of soil disturbance activity (numerical feature) can be extracted by using a combination of high-resolution remote sensing spectral feature data (e.g., microwave spectrum data), weather parameters and soil characteristics information. The soil disturbance activity is generally registered as a change in soil texture and porosity, and it can be derived using one or more machine learning algorithms (e.g., SVM, decision tree-based algorithms, etc.) and/or deep learning algorithms (e.g., CNN).

Also, in at least one embodiment, the degree of temperature inversion (numerical) and the start and end of the inversion activity can be derived from a least one physics-based mathematical model and/or machine learning-based model using weather-related parameters and remote sensing data. Further, the type and degree of pest attack (categorical) can be derived by using a combination of physics-based trajectory data, at least one plant growth model, weather-related parameters, and remote sensing spectral data. As also detailed herein, in one or more embodiments, a pest estimation model can include a machine learning-based model which takes input from a forecasted pest type and risk, along with residual difference in estimated biomass and an expected biomass (e.g., from a plant growth model).

Referring again to FIG. 1, the contextual feature derivation system 108, based at least in part on the processing of such input data, determines contextual features such as, for example, weeding-related features, soil disturbance features, temperature inversion-related features, and features pertaining to the type and degree of pest and/or disease attack(s). Such contextual features are then output to a learning model 110 along with one or more GHG emission estimates 112 from one or more process-based models and GHG-related in-situ measurements 114. Based at least in part on processing such inputs, learning model 110 generates at least one updated GHG emission determination 116.

In one or more embodiments, learning model 110 includes a time series based-learning model (such as LSTM, an attention-based model, etc.) which is used to learn the needed corrections for GHG estimates from process-based models. The contextual features such as temperature inversion schedule, pest risk, weeding and soil disturbance activity are normalized by applying scaling and encoding techniques for numerical and categorically features, respectively. The normalized contextual features and GHG estimates from process-based models are used as inputs to the time series learning model, which processes such inputs to learn the corrected GHG traces from the farm fields with help of measured GHGs from the sensors in-ground during the training of the model.

Figure 2:
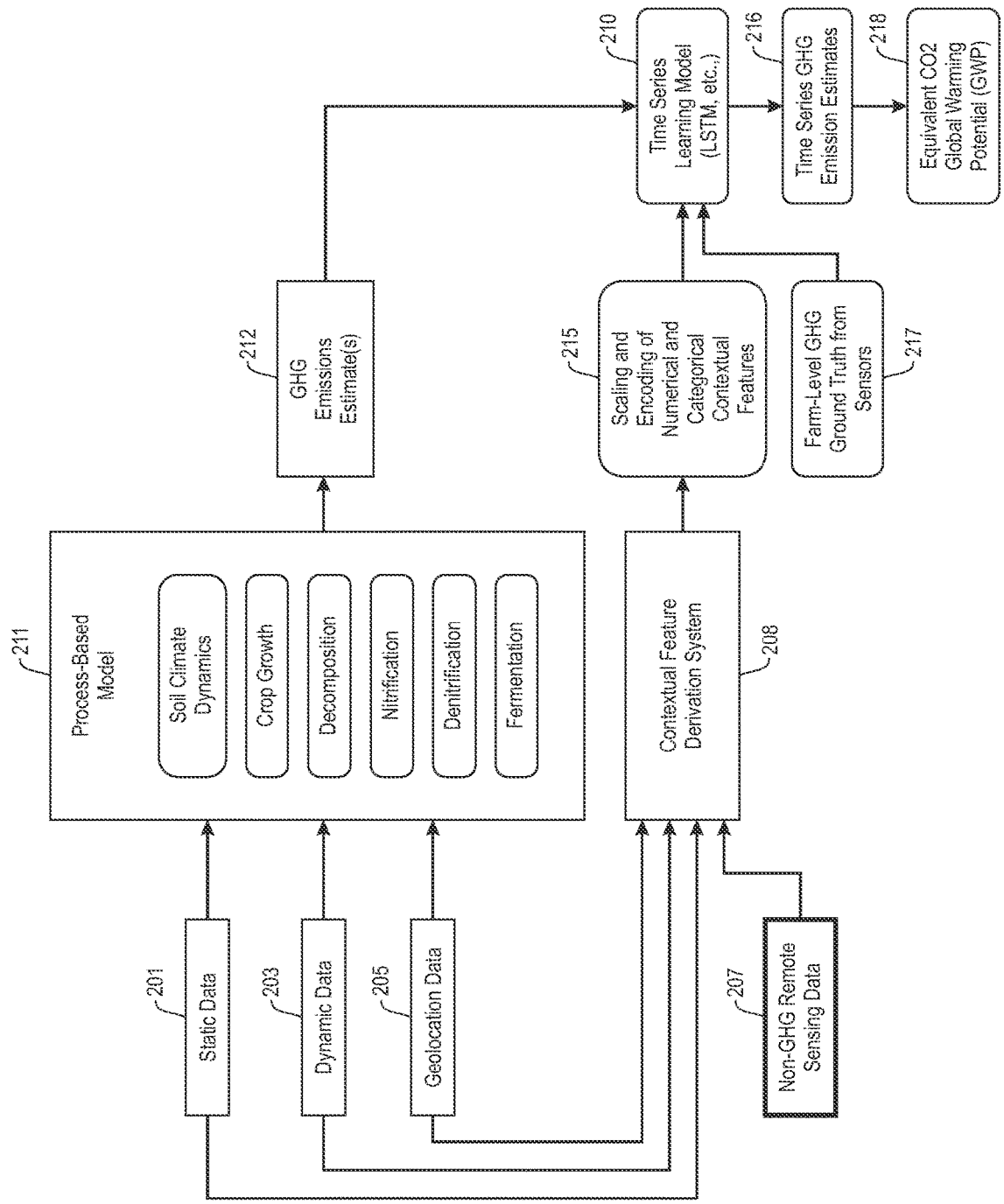
FIG. 2 is a diagram illustrating system architecture, according to an exemplary embodiment of the invention.

FIG. 2 is a diagram illustrating system architecture, according to an exemplary embodiment of the invention. By way of illustration, FIG. 2 depicts a process-based model 211, which processes static data 201 (which can include, for example, soil characteristics such as type, texture, organic carbon, etc., and crop characteristics such as biomass ratio of carbon-nitrogen for grain stems, leaves, and roots), dynamic data 203 (which can include, for example, weather data such as temperature data, precipitation data, humidity data, etc., and farm practices data such as irrigation information, manure information, fertilizer information, pesticide information, etc.), and geolocation data 205 in order to determine information pertaining, for example, to soil climate dynamics, crop growth, decomposition, nitrification, denitrification, and fermentation, which can be further used to generate one or more GHG emission estimates 212 (e.g., CO2 emission estimates, nitrous oxide emission estimates, methane emission estimates, etc.).

As also depicted in FIG. 2, contextual feature derivation system 208 processes static data 201, dynamic data 203, geolocation data 205, and non-GHG remote sensing data 207 (which can include, for example, optical and/or microwave spectrum data). Based at least on the processing of such input data, contextual feature derivation system 208 derives contextual features for one or more events such as soil disturbance, presence of weeds (unwanted plants), temperature inversion and type(s) of pest and/or disease attack(s) for a farming field of interest. Additionally, in step 215, at least one embodiment includes scaling and encoding of numerical and categorical contextual features generated by contextual feature derivation system 208. With respect to step 215, the scaling of numerical features can be done using one or more normalization techniques (e.g., min-max scaling) and/or one or more standard scaling techniques (e.g., zero mean and unit standard deviation). Because the time series machine learning algorithm (e.g., LSTM and/or attention-based model) can require the encoding of a categorical variable to a numerical value, at least one embodiment can include leveraging an encoding technique such as one-hot encoding, binary encoding, etc.

The scaled and encoded features are then processed, in addition to at least a portion of the GHG emissions estimate(s) 212 generated by process-based model 211 and farm-level GHG ground truth 217 from one or more sensors, by a time series learning model 210 (which can include, for example, a long short-term memory (LSTM) model or other type of neural network). The time series learning model 210 then generates one or more time series GHG emission estimates 216 (e.g., estimates that update the GHG emission estimates 212 from the process-based model 211 on the basis of quantity and/or time delay). The time series GHG emission estimates 216 can then be used, in one or more embodiments, to generate equivalent CO2 global warming potential values 218. By way of illustration, according to at least one GHG protocol standard, all GHG gases should be converted to 100 year global warming potential (GWP) equivalent CO2 standard scale. The conversion factor, for example, for methane is 25 and for nitrous oxide (N2O) is 298, as per the International Panel on Climate Change (IPCC).

Figure 3:
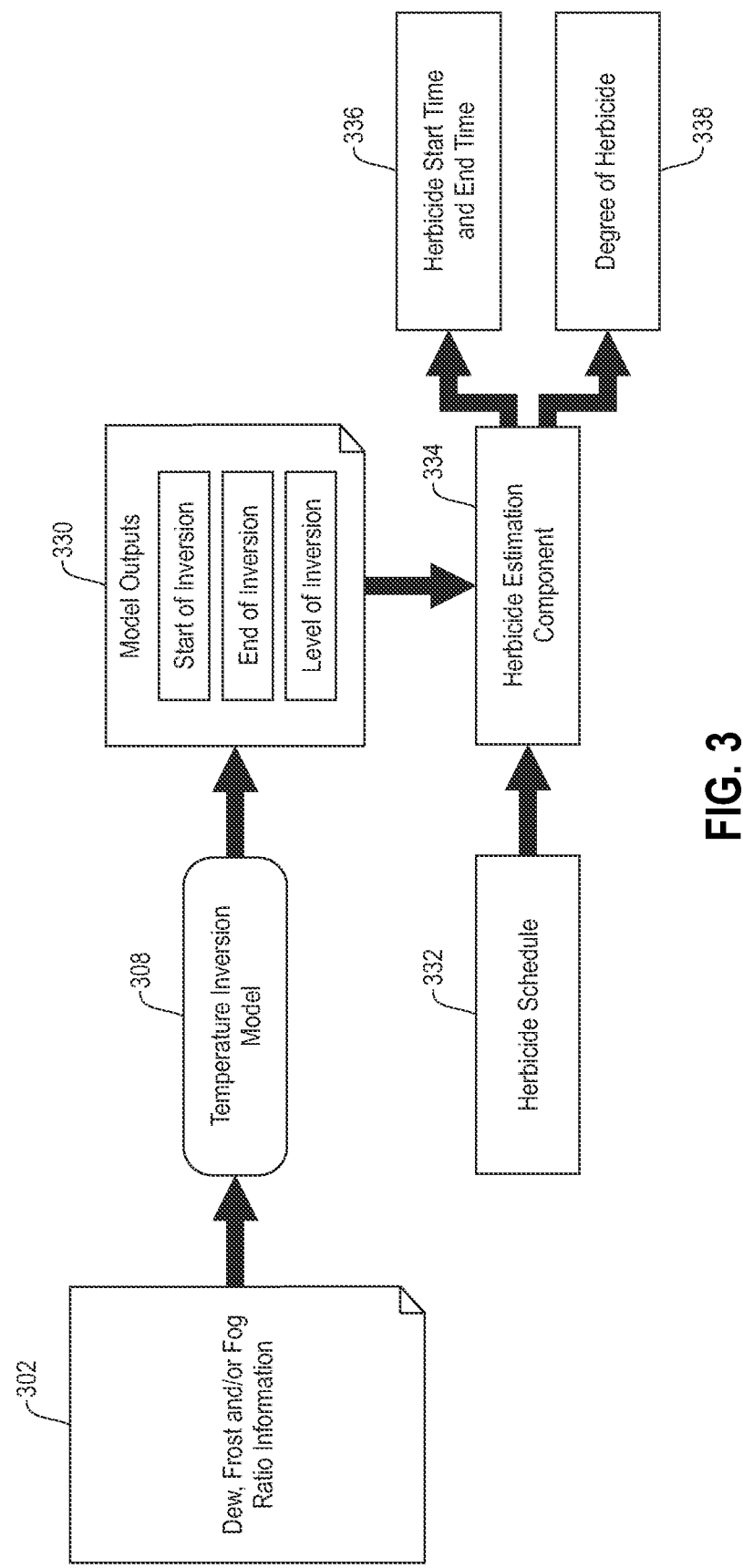
FIG. 3 is a diagram illustrating system methodology, according to an exemplary embodiment of the invention.
Figure 4:
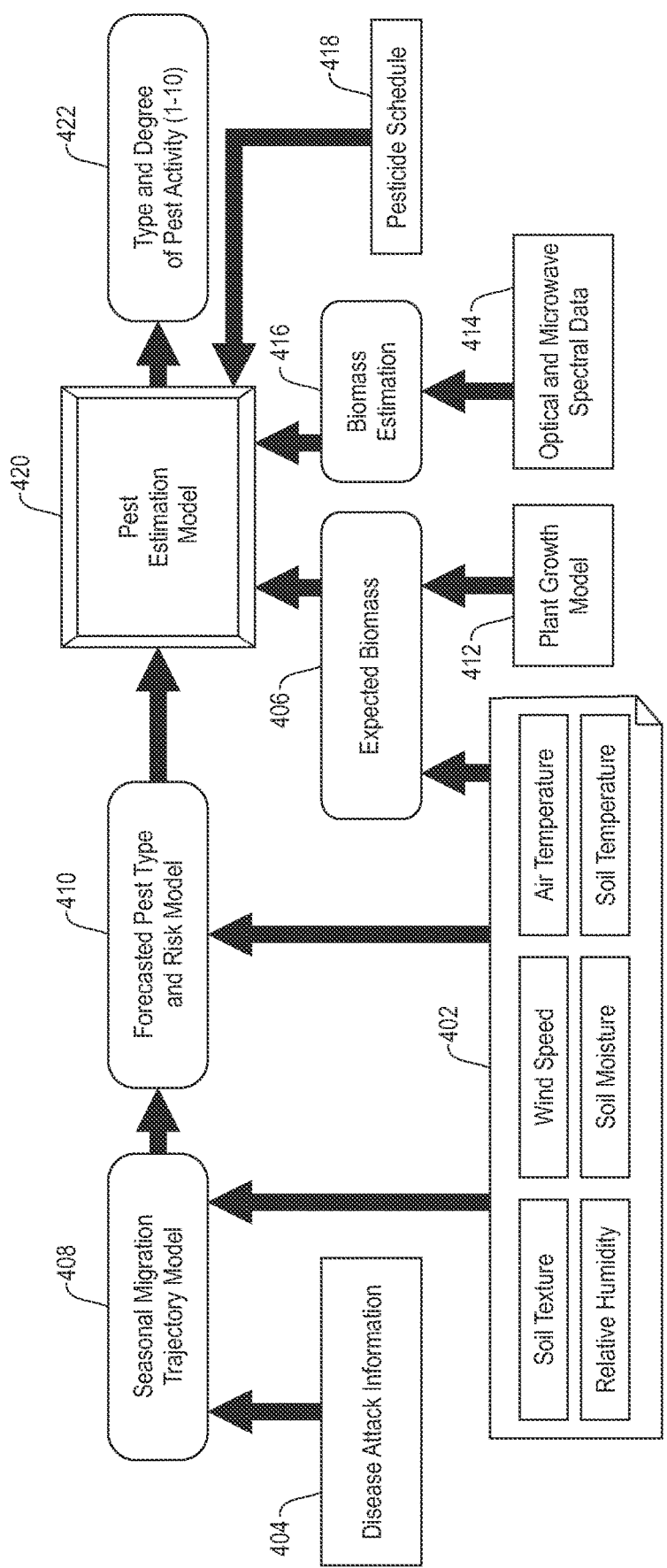
FIG. 4 is a diagram illustrating system methodology, according to an exemplary embodiment of the invention.

FIG. 3 is a diagram illustrating system methodology, according to an exemplary embodiment of the invention. More specifically, FIG. 3 depicts system methodology pertaining to estimating the degree of temperature inversion, which can be carried out, for example, by contextual feature derivation system 108 or 208. Dew, frost and/or fog ratio information 302 is processed by temperature inversion model 308, and based at least in part on such processing, temperature inversion model 308 generates model outputs 330 which can include, for example, information pertaining to the start of an inversion, the end of an inversion, and the level of an inversion. By way of example, in at least one embodiment, the temperature inversion model 308 can be a physics-based mathematical model and/or machine learning-based model, which uses weather-related parameters and remote sensing data.

Model outputs 330 are provided, along with an herbicide scheduler 332 (pertaining to the farm/agricultural field in question), to an herbicide estimation component 334, which detects the overlap of inversion events with an herbicide schedule. Accordingly, based on such detections, the herbicide estimation component generates and/or outputs an updated herbicide start time and end time 336, as well as an updated degree (e.g., a scale of 0-10) of herbicide 338 corresponding to the updated start and end times 336.

As detailed herein, differences in temperature profiles can form an inversion layer, which in turn traps and/or prevents herbicide droplets from reaching the target plant(s). The amount of herbicide application changes the emissions from the agricultural fields, and the estimated degree of herbicide will provide information about the actual amount of herbicide reaching the targeted plant(s).

FIG. 4 is a diagram illustrating system methodology, according to an exemplary embodiment of the invention. More specifically, FIG. 4 depicts system methodology pertaining to estimating the type and degree of pest and/or disease attack. Climate-related and/or agricultural-related inputs 402 (e.g., soil texture information, wind speed information, air temperature information, relative humidity information, soil moisture information, soil temperature information, etc.) and disease attack information 404 (e.g., information pertaining to attacks around the boundaries of the given farm/agricultural field) are provided to and/or processed by seasonal migration trajectory model 408, which generates output which is provided to and/or processed (in conjunction with at least a portion of inputs 402) by forecasted pest type and risk model 410. The seasonal migration trajectory model 408 can include, for example, a physics-based model which processes weather-related parameters and generates information about the migration of one or more pests. The forecasted pest type and risk model 410 can include a physics-based model and/or machine learning-based model which generates a forecasted degree of pest activity (including the type of pest and corresponding level of risk (categorical features)) in that particular region of interest using the predicted migration of pest trajectory and weather-related parameters.

As also depicted in FIG. 4, inputs 402 and at least one plant growth model 412 are used to determine an expected biomass 406, which, along with the output generated by forecasted pest type and risk model 410, is then provided to and/or processed by pest estimation model 420. Based at least in part on processing these inputs, in addition to at least one biomass estimation 416 (generated based on analysis of optical and microwave spectral data 414) and at least one pesticide schedule 418, the pest estimation model 420 generates a determination pertaining to the type and degree of pest activity 422 (e.g., degree of activity can range on a scale from 1-10). In at least one embodiment, the pest estimation model 420 includes a machine learning-based regressor (e.g., a decision tree-based model) which processes input features such as forecasted pest type and risk, expected biomass from a crop growth model, estimated biomass from remote sensing spectral data, and/or any known pesticide schedule, and based on such processing, learns the actual degree of pest attack and type (categorical variables).

Accordingly, and as detailed herein, the amount of biomass and its interaction with soil biochemistry can be impacted based on the degree and type of pest activity (e.g., attack(s)). The type and degree of pest activity can be estimated based on differences in biomass from the expected biomass values along with forecasted pest risk(s). The degree of pest activity can provide information, for example, about the extent of damage caused by the pest(s) on the biomass.

Additionally, one or more embodiments includes estimating soil disturbance activity. Soil disturbance activity during a crop cycle changes or shifts the rate of release of GHG gases trapped in the soil. A typical soil disturbance activity includes, for example, a manual or machine-based intervention on the farm field for mechanical weeding or for spraying pesticides, herbicides and/or fertilizers. The degree of soil disturbance can be derived by detecting, in one or more embodiments, weeding activity (e.g., machine-based or manual weeding activity) based on remote sensing analysis of farming practices, as well as detecting the implementation (e.g., spraying) of pesticides, herbicides and/or fertilizers based on remote sensing.

At least one embodiment additionally includes estimating the presence of weeds and weeding activity. The presence of weeds changes the overall GHG emissions from a given farm field. The unwanted plants create an imbalance in available resources such as water, fertilizers, etc., for the main crop(s) of interest. Typically, common practiced weeding processes can include mechanical and/or manual weeding activity, chemical weeding activity, and firing-related weeding activity, which can alter the amount of carbon content in the soil, increase GHG emissions, etc.

Figure 5:
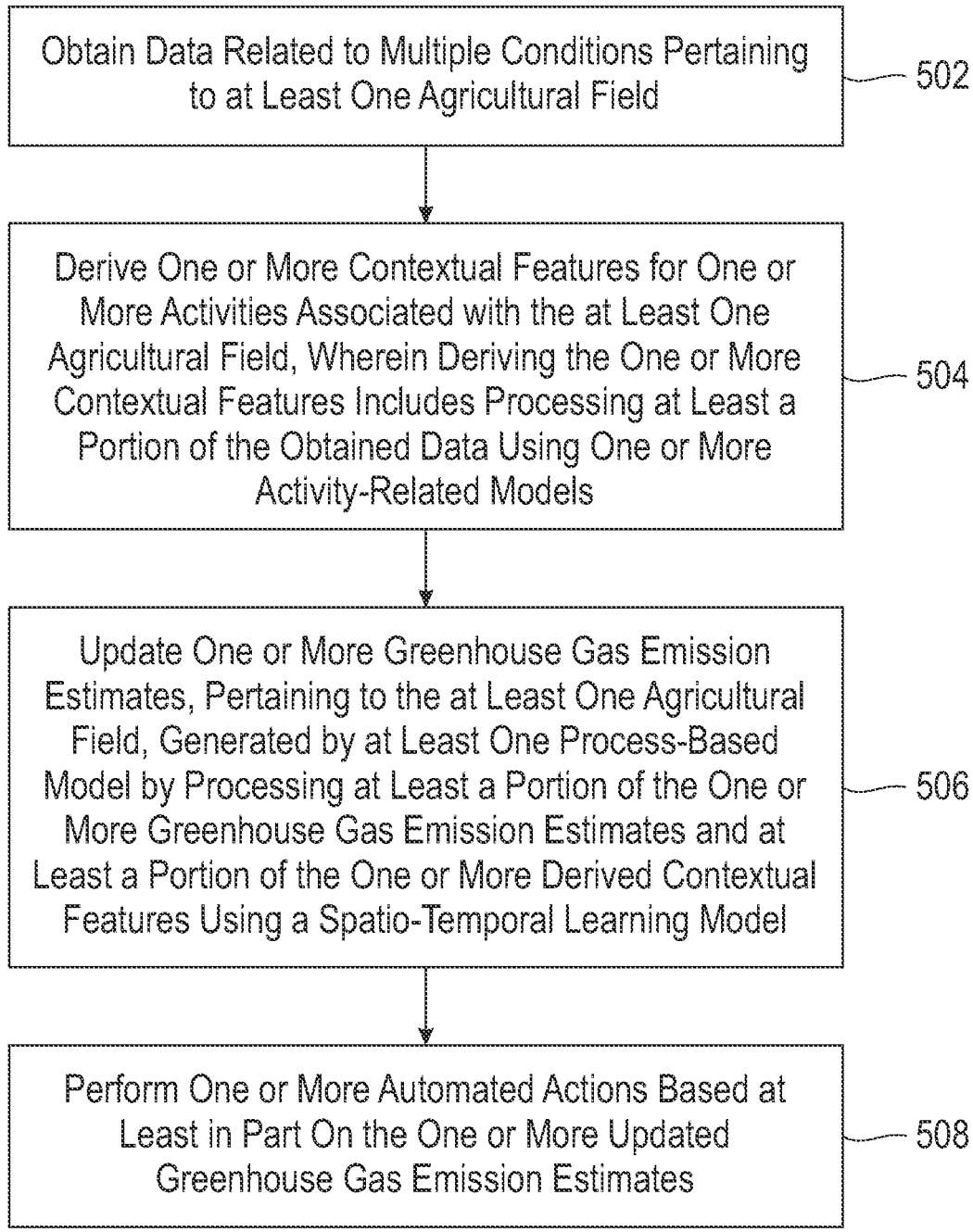
FIG. 5 is a flow diagram illustrating techniques according to an embodiment of the invention.

FIG. 5 is a flow diagram illustrating techniques according to an embodiment of the present invention. Step 502 includes obtaining data related to multiple conditions pertaining to at least one agricultural field. In at least one embodiment, obtaining data can include obtaining hyperspectral optical data related to one or more conditions pertaining to the at least one agricultural field and/or obtaining microwave data related to one or more conditions pertaining to the at least one agricultural field. Additionally or alternatively, obtaining data can include obtaining one or more of soil-related data, agricultural field practices-related data, weather-related data, and geolocation data.

Step 504 includes deriving one or more contextual features for one or more activities associated with the at least one agricultural field, wherein deriving the one or more contextual features includes processing at least a portion of the obtained data using one or more activity-related models. In one or more embodiments, deriving one or more contextual features for one or more activities associated with the at least one agricultural field includes deriving one or more contextual features for one or more of soil disturbance activity, weeding-related activity, temperature inversion activity, pest-related activity, and disease-related activity.

Step 506 includes updating one or more greenhouse gas emission estimates, pertaining to the at least one agricultural field, generated by at least one process-based model by processing at least a portion of the one or more greenhouse gas emission estimates and at least a portion of the one or more derived contextual features using a spatio-temporal learning model. In at least one embodiment, the spatio-temporal learning model can include at least one neural network and/or at least one long short-term memory model. Additionally, in one or more embodiments, updating the one or more greenhouse gas emission estimates includes updating the one or more greenhouse gas emission estimates on a basis of at least one of greenhouse gas emission quantity and greenhouse gas emission temporal delay.

Step 508 includes performing one or more automated actions based at least in part on the one or more updated greenhouse gas emission estimates. In at least one embodiment, performing one or more automated actions includes automatically training the one or more activity-related models based at least in part on one or more of the one or more derived contextual features and the one or more updated greenhouse gas emission estimates and/or automatically training the spatio-temporal learning model based at least in part on one or more of the one or more derived contextual features and the one or more updated greenhouse gas emission estimates. Additionally or alternatively, performing one or more automated actions can include generating one or more agricultural-related instructions to be carried out by at least one of one or more automated systems and one or more users, and/or performing one or more automated agricultural-related modifications to at least a portion of the at least one agricultural field.

Further, in one or more embodiments, software implementing the techniques depicted in FIG. 5 can be provided as a service in a cloud environment.

It is to be appreciated that "model," as used herein, refers to an electronic digitally stored set of executable instructions and data values, associated with one another, which are capable of receiving and responding to a programmatic or other digital call, invocation, or request for resolution based upon specified input values, to yield one or more output values that can serve as the basis of computer-implemented recommendations, output data displays, machine control, etc. Persons of skill in the field find it convenient to express models using mathematical equations, but that form of expression does not confine the models disclosed herein to abstract concepts; instead, each model herein has a practical application in a computer in the form of stored executable instructions and data that implement the model using the computer.

The techniques depicted in FIG. 5 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 5 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 6:
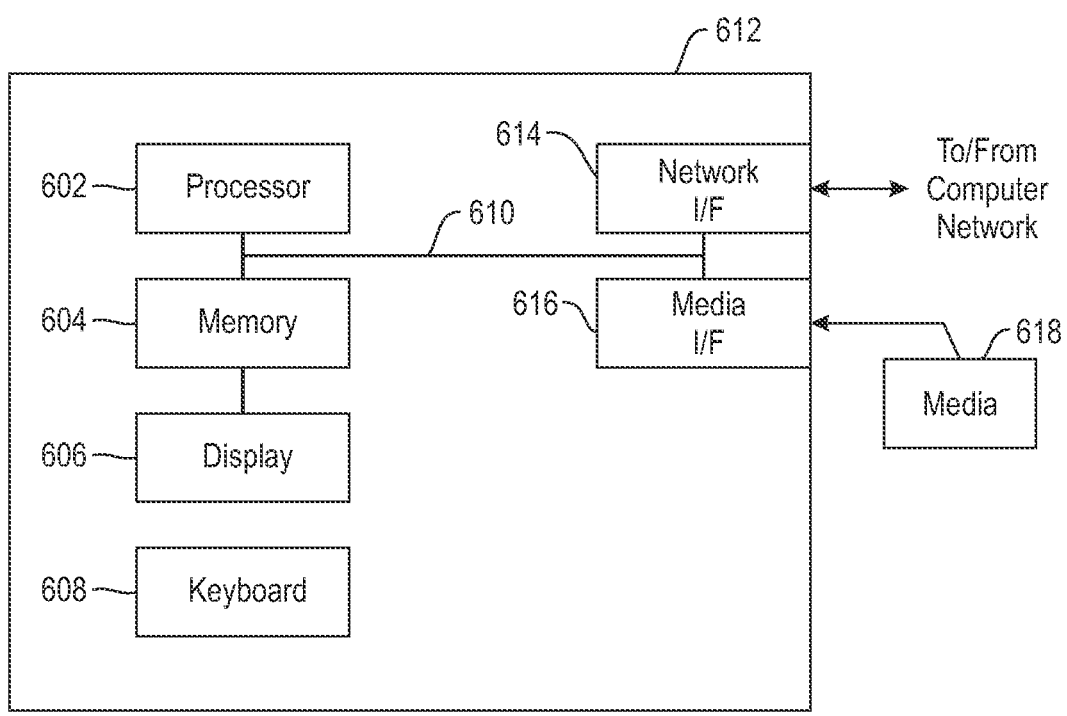
FIG. 6 is a system diagram of an exemplary computer system on which at least one embodiment of the invention can be implemented.

Additionally, an embodiment of the present invention can make use of software running on a computer or workstation. With reference to FIG. 6, such an implementation might employ, for example, a processor 602, a memory 604, and an input/output interface formed, for example, by a display 606 and a keyboard 608. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 602, memory 604, and input/output interface such as display 606 and keyboard 608 can be interconnected, for example, via bus 610 as part of a data processing unit 612. Suitable interconnections, for example via bus 610, can also be provided to a network interface 614, such as a network card, which can be provided to interface with a computer network, and to a media interface 616, such as a diskette or CD-ROM drive, which can be provided to interface with media 618.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 602 coupled directly or indirectly to memory elements 604 through a system bus 610. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 608, displays 606, pointing devices, and the like) can be coupled to the system either directly (such as via bus 610) or through intervening I/O controllers (omitted for clarity).

Network adapters such as network interface 614 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 612 as shown in FIG. 6) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 602. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

Additionally, it is understood in advance that implementation of the teachings recited herein are not limited to a particular computing environment. Rather, embodiments of the present invention are capable of being implemented in conjunction with any type of computing environment now known or later developed.

For example, cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
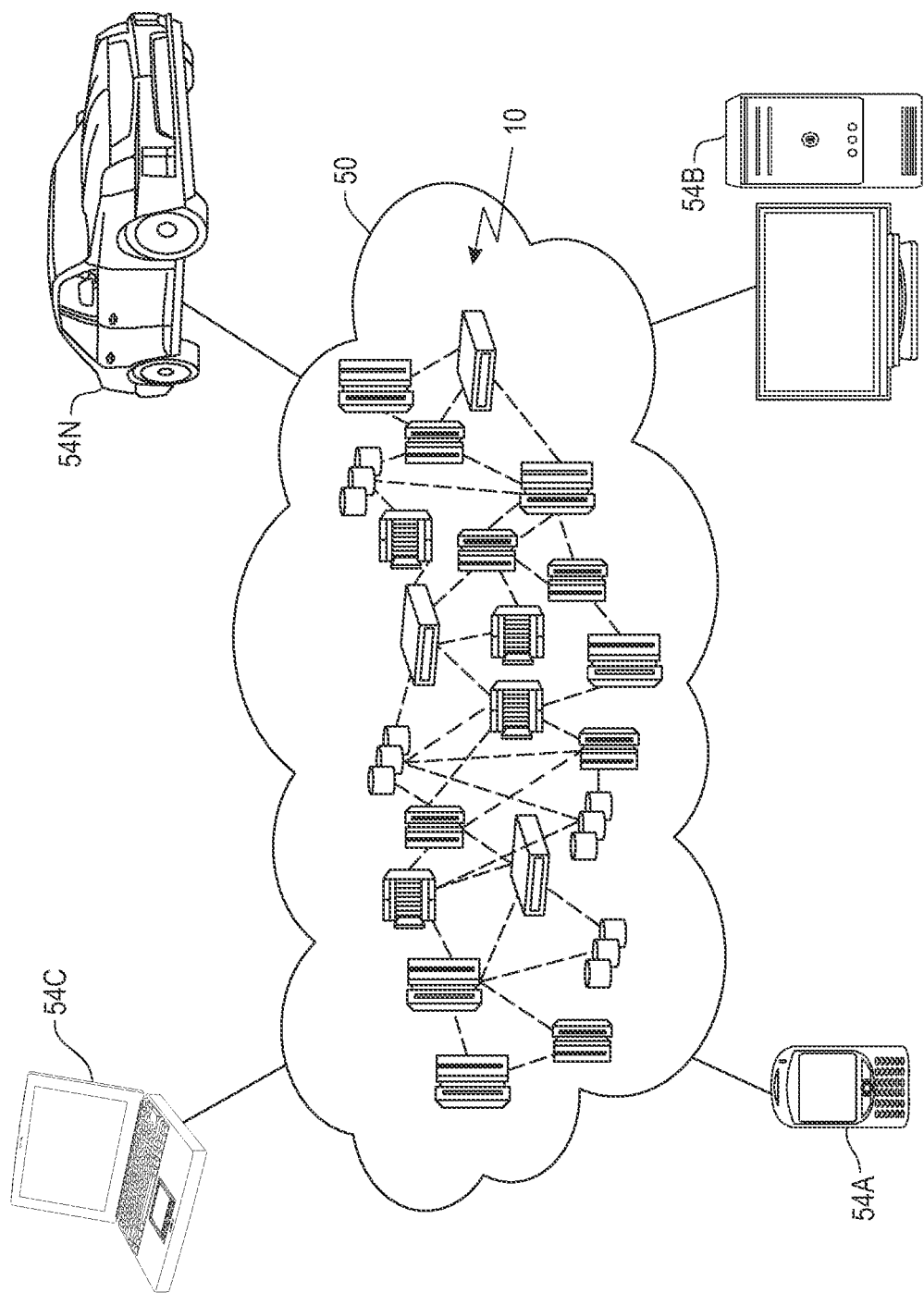
FIG. 7 depicts a cloud computing environment according to an embodiment of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
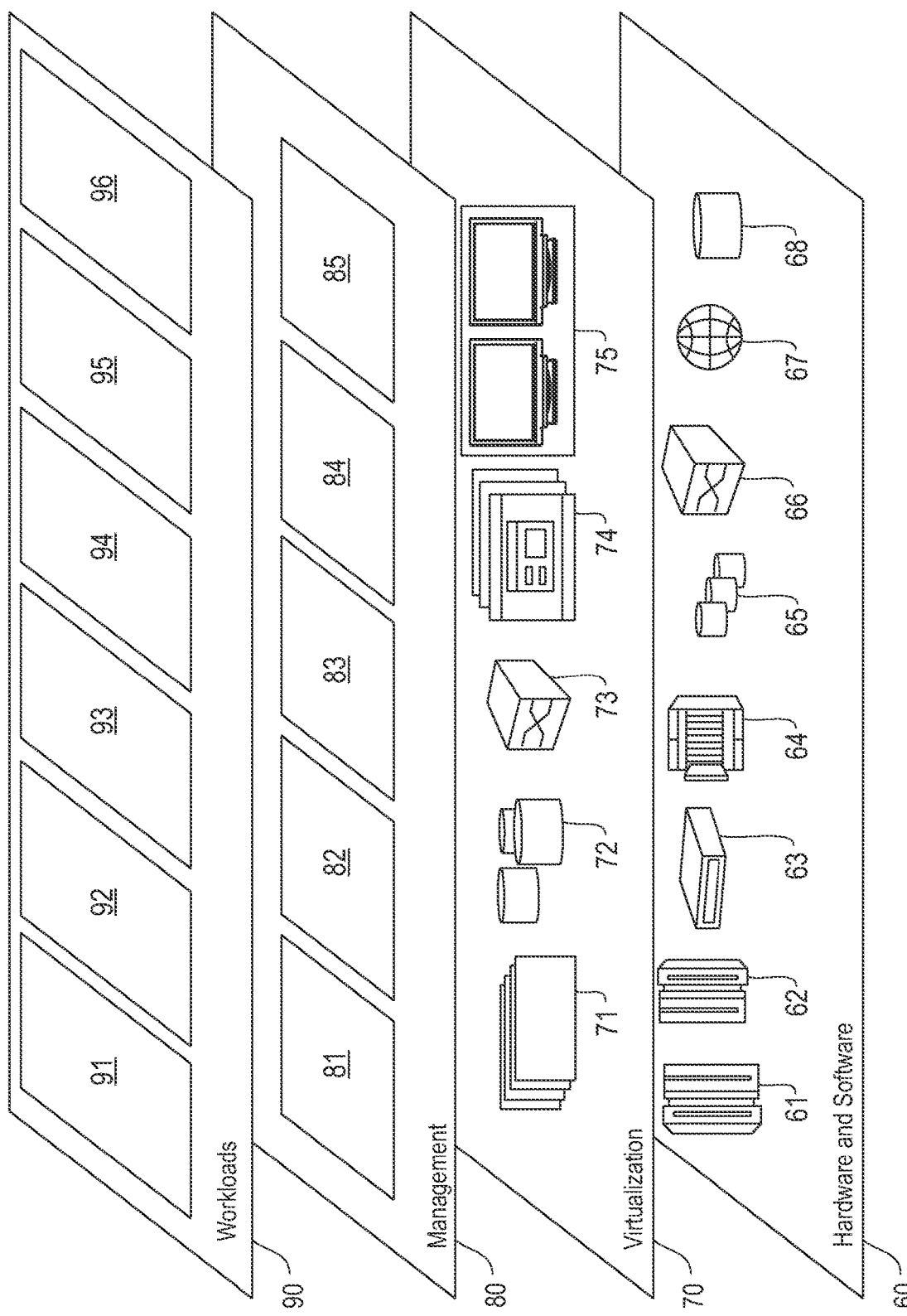
FIG. 8 depicts abstraction model layers according to an embodiment of the present invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and context-aware GHG emission modeling 96, in accordance with the one or more embodiments of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, generating and/or implementing context-aware process-based models for GHG emissions from agricultural fields.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
obtaining data related to multiple conditions pertaining to at least one agricultural field;
deriving one or more contextual features for one or more activities associated with the at least one agricultural field, wherein deriving the one or more contextual features comprises processing at least a portion of the obtained data using one or more activity-related models, and wherein deriving the one or more contextual features comprises deriving one or more contextual features for weeding-related activity and deriving one or more contextual features for at least one of soil disturbance activity, temperature inversion activity, pest-related activity, and disease-related activity;
updating one or more greenhouse gas emission estimates, pertaining to the at least one agricultural field, generated by at least one process-based model by processing at least a portion of the one or more greenhouse gas emission estimates and at least a portion of the one or more derived contextual features using a spatio-temporal learning model, wherein the spatio-temporal learning model comprises at least one neural network, and wherein updating the one or more greenhouse gas emission estimates comprises updating the one or more greenhouse gas emission estimates based at least in part on one or more greenhouse gas emission quantity updates and one or more greenhouse gas emission temporal updates, wherein the one or more greenhouse gas emission temporal updates comprise one or more contextual feature-effected time delay corrections to the one or more greenhouse gas emission estimates generated by the at least one process-based model, the one or more contextual feature-effected time delay corrections being related to forecasted timing of greenhouse gas emission relative to performance of at least one of the one or more activities associated with the at least one agricultural field; and
performing one or more automated actions based at least in part on the one or more updated greenhouse gas emission estimates, wherein performing the one or more automated actions comprises automatically training the spatio-temporal learning model using at least a portion of the one or more updated greenhouse gas emission estimates;
wherein the method is carried out by at least one computing device.

2. The computer-implemented method of claim 1, wherein obtaining data comprises obtaining hyperspectral optical data related to one or more conditions pertaining to the at least one agricultural field.

3. The computer-implemented method of claim 1, wherein obtaining data comprises obtaining microwave data related to one or more conditions pertaining to the at least one agricultural field.

4. The computer-implemented method of claim 1, wherein obtaining data comprises obtaining one or more of soil-related data, agricultural field practices-related data, weather-related data, and geolocation data.

5. The computer-implemented method of claim 1, wherein the spatio-temporal learning model comprises at least one long short-term memory model.

6. The computer-implemented method of claim 1, wherein performing one or more automated actions comprises automatically training the one or more activity-related models based at least in part on one or more of the one or more derived contextual features and the one or more updated greenhouse gas emission estimates.

7. The computer-implemented method of claim 1, wherein performing one or more automated actions comprises generating one or more agricultural-related instructions to be carried out by at least one of one or more automated systems and one or more users.

8. The computer-implemented method of claim 1, wherein performing one or more automated actions comprises performing one or more automated agricultural-related modifications to at least a portion of the at least one agricultural field.

9. The computer-implemented method of claim 1, wherein software implementing the method is provided as a service in a cloud environment.

10. A computer program product comprising a non-transitory computer readable storage medium having program instructions embodied therewith, the program instructions executable by a computing device to cause the computing device to:
obtain data related to multiple conditions pertaining to at least one agricultural field;
derive one or more contextual features for one or more activities associated with the at least one agricultural field, wherein deriving the one or more contextual features comprises processing at least a portion of the obtained data using one or more activity-related models, and wherein deriving the one or more contextual features comprises deriving one or more contextual features for weeding-related activity and deriving one or more contextual features for at least one of soil disturbance activity, temperature inversion activity, pest-related activity, and disease-related activity;
update one or more greenhouse gas emission estimates, pertaining to the at least one agricultural field, generated by at least one process-based model by processing at least a portion of the one or more greenhouse gas emission estimates and at least a portion of the one or more derived contextual features using a spatio-temporal learning model, wherein the spatio-temporal learning model comprises at least one neural network, and wherein updating the one or more greenhouse gas emission estimates comprises updating the one or more greenhouse gas emission estimates based at least in part on one or more greenhouse gas emission quantity updates and one or more greenhouse gas emission temporal updates, wherein the one or more greenhouse gas emission temporal updates comprise one or more contextual feature-effected time delay corrections to the one or more greenhouse gas emission estimates generated by the at least one process-based model, the one or more contextual feature-effected time delay corrections being related to forecasted timing of greenhouse gas emission relative to performance of at least one of the one or more activities associated with the at least one agricultural field; and
perform one or more automated actions based at least in part on the one or more updated greenhouse gas emission estimates, wherein performing the one or more automated actions comprises automatically training the spatio-temporal learning model using at least a portion of the one or more updated greenhouse gas emission estimates.

11. The computer program product of claim 10, wherein obtaining data comprises obtaining hyperspectral optical data related to one or more conditions pertaining to the at least one agricultural field.

12. The computer program product of claim 10, wherein obtaining data comprises obtaining microwave data related to one or more conditions pertaining to the at least one agricultural field.

13. The computer program product of claim 10, wherein the spatio-temporal learning model comprises at least one long short-term memory model.

14. A system comprising:
a memory configured to store program instructions; and
a processor operatively coupled to the memory to execute the program instructions to:
obtain data related to multiple conditions pertaining to at least one agricultural field;
derive one or more contextual features for one or more activities associated with the at least one agricultural field, wherein deriving the one or more contextual features comprises processing at least a portion of the obtained data using one or more activity-related models, and wherein deriving the one or more contextual features comprises deriving one or more contextual features for weeding-related activity and deriving one or more contextual features for at least one of soil disturbance activity, temperature inversion activity, pest-related activity, and disease-related activity;
update one or more greenhouse gas emission estimates, pertaining to the at least one agricultural field, generated by at least one process-based model by processing at least a portion of the one or more greenhouse gas emission estimates and at least a portion of the one or more derived contextual features using a spatio-temporal learning model, wherein the spatio-temporal learning model comprises at least one neural network, and wherein updating the one or more greenhouse gas emission estimates comprises updating the one or more greenhouse gas emission estimates based at least in part on one or more greenhouse gas emission quantity updates and one or more greenhouse gas emission temporal updates, wherein the one or more greenhouse gas emission temporal updates comprise one or more contextual feature-effected time delay corrections to the one or more greenhouse gas emission estimates generated by the at least one process-based model, the one or more contextual feature-effected time delay corrections being related to forecasted timing of greenhouse gas emission relative to performance of at least one of the one or more activities associated with the at least one agricultural field; and
perform one or more automated actions based at least in part on the one or more updated greenhouse gas emission estimates, wherein performing the one or more automated actions comprises automatically training the spatio-temporal learning model using at least a portion of the one or more updated greenhouse gas emission estimates.

15. The system of claim 14, wherein performing one or more automated actions comprises automatically training the one or more activity-related models based at least in part on one or more of the one or more derived contextual features and the one or more updated greenhouse gas emission estimates.

16. The system of claim 14, wherein performing one or more automated actions comprises generating one or more agricultural-related instructions to be carried out by at least one of one or more automated systems and one or more users.

17. The system of claim 14, wherein performing one or more automated actions comprises performing one or more automated agricultural-related modifications to at least a portion of the at least one agricultural field.

18. The system of claim 14, wherein obtaining data comprises obtaining hyperspectral optical data related to one or more conditions pertaining to the at least one agricultural field.

19. The system of claim 14, wherein obtaining data comprises obtaining microwave data related to one or more conditions pertaining to the at least one agricultural field.

20. The system of claim 14, wherein obtaining data comprises obtaining one or more of soil-related data, agricultural field practices-related data, weather-related data, and geolocation data.

* * * * *